United States Patent
Xie et al.

(10) Patent No.: US 11,016,619 B2
(45) Date of Patent: May 25, 2021

(54) TOUCH PANEL, METHOD OF MANUFACTURING THE SAME AND TOUCH DISPLAY PANEL

(71) Applicants: Hefei Xinsheng Optoelectronics Technology Co., Ltd., Anhui (CN); BOE Technology Group Co., Ltd., Beijing (CN)

(72) Inventors: Xiaodong Xie, Beijing (CN); Tsungchieh Kuo, Beijing (CN); Jing Wang, Beijing (CN); Tengfei Zhong, Beijing (CN); Yaying Li, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/335,887

(22) PCT Filed: Aug. 31, 2018

(86) PCT No.: PCT/CN2018/103535
§ 371 (c)(1),
(2) Date: Mar. 22, 2019

(87) PCT Pub. No.: WO2019/056939
PCT Pub. Date: Mar. 28, 2019

(65) Prior Publication Data
US 2020/0159353 A1 May 21, 2020

(30) Foreign Application Priority Data
Sep. 21, 2017 (CN) .......................... 201710860530.7

(51) Int. Cl.
*G06F 3/044* (2006.01)
*G06F 3/041* (2006.01)

(52) U.S. Cl.
CPC ............ *G06F 3/0443* (2019.05); *G06F 3/044* (2013.01); *G06F 3/0412* (2013.01); *G06F 3/0448* (2019.05); *G06F 2203/04112* (2013.01)

(58) Field of Classification Search
CPC ................. G06F 3/0412; G06F 3/0448; G06F 2203/04112
See application file for complete search history.

(56) References Cited

U.S. PATENT DOCUMENTS

| 4,659,874 A * | 4/1987 | Landmeier .............. G06F 3/044 178/18.03 |
| 6,297,811 B1 * | 10/2001 | Kent ....................... G06F 3/044 178/18.01 |

(Continued)

FOREIGN PATENT DOCUMENTS

| CN | 204557432 U | 8/2015 |
| CN | 105161514 A | 12/2015 |

(Continued)

OTHER PUBLICATIONS

International Search Report and Written Opinion (including English translations of search report and Box V of Written Opinion) for International Application No. PCT/CN2018/103535, dated Nov. 28, 2018, 12 pages.

*Primary Examiner* — Nitin Patel
*Assistant Examiner* — Robert M Stone
(74) *Attorney, Agent, or Firm* — Westman, Champlin & Koehler, P.A.

(57) ABSTRACT

Some embodiments of the present disclosure provide a touch panel a method of manufacturing the touch panel and a touch display panel. The touch panel includes a touch substrate; and a plurality of touch electrodes on the touch substrate, the (Continued)

plurality of touch electrodes being spaced apart from each other in a first direction and extending in a second direction different from the first direction, wherein a width of each of the touch electrodes gradually increases or decreases in the second direction.

14 Claims, 5 Drawing Sheets

(56) References Cited

U.S. PATENT DOCUMENTS

| | | | |
|---|---|---|---|
| 9,081,453 B2* | 7/2015 | Bulea | G06F 3/041 |
| 10,275,085 B2* | 4/2019 | Nakanishi | G02F 1/13338 |
| 2010/0123670 A1* | 5/2010 | Philipp | G06F 3/044 |
| | | | 345/173 |
| 2012/0062250 A1* | 3/2012 | Kuo | G06F 3/044 |
| | | | 324/686 |
| 2013/0141380 A1* | 6/2013 | Wang | G06F 3/041 |
| | | | 345/173 |
| 2013/0161070 A1* | 6/2013 | Lee | H05K 3/105 |
| | | | 174/250 |
| 2013/0169591 A1* | 7/2013 | Hung | C03C 21/00 |
| | | | 345/174 |
| 2013/0278513 A1* | 10/2013 | Jang | G06F 3/047 |
| | | | 345/173 |
| 2013/0299222 A1* | 11/2013 | Lee | H05K 1/0306 |
| | | | 174/258 |
| 2013/0335365 A1* | 12/2013 | Kim | G06F 3/044 |
| | | | 345/174 |
| 2014/0098305 A1* | 4/2014 | Mo | G06F 3/0412 |
| | | | 349/12 |
| 2014/0138143 A1* | 5/2014 | Lee | G06F 3/044 |
| | | | 174/268 |
| 2014/0300835 A1* | 10/2014 | Chu | G06F 3/0412 |
| | | | 349/12 |
| 2014/0333556 A1* | 11/2014 | Lin | G06F 3/041 |
| | | | 345/173 |
| 2015/0015810 A1* | 1/2015 | Lee | G06F 3/044 |
| | | | 349/12 |
| 2016/0048248 A1* | 2/2016 | Na | G06F 3/044 |
| | | | 345/174 |
| 2016/0147336 A1* | 5/2016 | Han | G06F 3/044 |
| | | | 345/174 |
| 2016/0170541 A1* | 6/2016 | Iwami | G06F 3/0412 |
| | | | 345/174 |
| 2016/0216806 A1* | 7/2016 | Nakamura | B32B 15/02 |
| 2017/0102342 A1* | 4/2017 | Iwami | B32B 7/02 |
| 2017/0200263 A1* | 7/2017 | Iwami | H05K 9/00 |
| 2017/0243342 A1* | 8/2017 | Iwami | G06T 7/0004 |
| 2018/0101258 A1* | 4/2018 | Oho | G06F 3/041 |
| 2018/0181234 A1* | 6/2018 | Hammura | G06F 3/04164 |

FOREIGN PATENT DOCUMENTS

| | | | | |
|---|---|---|---|---|
| CN | 107463296 A | 12/2017 | | |
| CN | 207408920 U | 5/2018 | | |
| JP | 5249806 B2 | 7/2013 | | |
| WO | WO-2019056939 A1 * | 3/2019 | | G06F 3/0443 |

* cited by examiner

TOUCH PANEL, METHOD OF MANUFACTURING THE SAME AND TOUCH DISPLAY PANEL

CROSS-REFERENCE TO RELATED APPLICATION

This application is a Section 371 National Stage Application of International Application No. PCT/CN2018/103535, filed on Aug. 31, 2018, and claims priority to Chinese Patent Application No. 201710860530.7 filed on Sep. 21, 2017 in the State Intellectual Property Office of China, the disclosures of which are incorporated herein by reference.

TECHNICAL FIELD

The present disclosure relates to the field of touch control technology, and in particular, to a touch panel, a method of manufacturing the touch panel, and a touch display panel.

BACKGROUND

In the field of touch display technology, a touch display device, such as a touch screen, is an inductive display device which calculates contact coordinates according to received input signals for positioning, and mainly includes a touch panel and a touch chip. The touch panel detects touch positions of the user and sends the detected input signals to the touch chip. The touch chip converts the input signals into contact coordinates and sends them to a central processing unit, and receives signals from the central processing unit and executes the signals to achieve human-computer interaction. With the development of touch screens, people are increasingly demanding the optical performance, electrical performance, appearance and cost of touch screens.

SUMMARY

Some embodiments of the present disclosure provide a touch panel comprising: a touch substrate; and a plurality of touch electrodes on the touch substrate, the plurality of touch electrodes being spaced apart from each other in a first direction and extending in a second direction different from the first direction, wherein a width of each of the touch electrodes gradually increases or decreases in the second direction.

In some embodiments, each of the touch electrodes has a metal mesh structure which is cut off in the first direction.

In some embodiments, the touch panel further comprising: a plurality of dummy touch electrodes in the same layer as the plurality of touch electrodes, the plurality of dummy touch electrodes and the plurality of touch electrodes being alternately arranged one by one in the first direction; wherein each of the dummy touch electrodes extends in the second direction and has a metal mesh structure which is cut off in the first direction, and the plurality of touch electrodes and the plurality of dummy touch electrodes constitute a metal mesh layer which is discontinuous in the first direction.

In some embodiments, the metal mesh layer is made of a flexible material.

In some embodiments, the metal mesh layer comprises a plurality of mesh openings having a shape of hexagonal, and the mesh openings of the metal mesh layer are arranged in a honeycomb shape.

In some embodiments, the width of each of touch electrodes gradually increases or decreases linearly in the second direction.

In some embodiments, the width of each of touch electrodes gradually increases or decreases in a stepwise manner in the second direction.

In some embodiments, the touch panel further comprising a touch chip on an edge of one side of the touch substrate, wherein each of touch electrodes is connected to the touch chip.

Some embodiments of the present disclosure provide a touch display panel comprising: a base substrate, a plurality of pixels on the base substrate, and the touch panel of the above embodiment, wherein the touch panel is stacked on the base substrate.

In some embodiments, the plurality of mesh openings in the metal mesh layer are in one-to-one correspondence with the plurality of pixels, and an orthographic projection of each of the pixels on the base substrate falls within an orthographic projection of a corresponding mesh opening on the base substrate.

In some embodiments, the plurality of mesh openings in the metal mesh layer are in one-to-one correspondence with the plurality of pixels, and an orthographic projection of each of the pixels on the base substrate coincides with an orthographic projection of a corresponding mesh opening on the base substrate.

In some embodiments, the metal mesh layer is on a side of the touch substrate facing the pixels.

In some embodiments, the metal mesh layer is on a side of the touch substrate facing away from the pixels.

In some embodiments, each of the pixels comprises an organic light emitting layer.

In some embodiments, an orthographic projection of the plurality of touch electrodes on the base substrate does not overlap with an orthographic projection of the plurality of pixels on the base substrate Some embodiments of the present disclosure provide a method of manufacturing a touch panel, comprising: providing a touch substrate, and forming a plurality of touch electrodes on the touch substrate, the plurality of touch electrodes being spaced apart from each other in a first direction and extending in a second direction different from the first direction.

In some embodiments, forming a plurality of touch electrodes on the touch substrate comprises: forming a metal mesh layer on the touch substrate by screen printing; and cutting off the metal mesh layer by a patterning process so that the metal mesh layer is discontinuous in the first direction.

In some embodiments, the metal mesh layer comprises a plurality of mesh openings having a shape of hexagonal, and the mesh openings of the metal mesh layer are arranged in a honeycomb shape.

In some embodiments, forming a plurality of touch electrodes on the touch substrate comprises: depositing a metal layer on the touch substrate; and patterning the metal layer to form a metal mesh layer that is discontinuous in the first direction.

DETAILED DESCRIPTION OF THE EMBODIMENTS

The technical solutions in the embodiments of the present disclosure are clearly and completely described below in conjunction with the accompanying drawings in the embodiments of the present disclosure. It is obvious that the described embodiments are only a part of the embodiments of the present disclosure, and not all of the embodiments. All other embodiments obtained by those skilled in the art based on the embodiments of the present disclosure without creative efforts are within the scope of the present disclosure.

In the related art, an OLED display panel can be bent and has a flexible characteristic, and an OLED touch screen manufactured by the same can be bent. The OLED touch screen realizes integration of touch function and display function by providing a touch panel and a touch chip on a conventional OLED display panel. In the related art, the OLED touch screen currently needs to be provided with a touch chip on the touch panel, and a complicated signal trace needs to be arranged between the touch chip and the touch panel, so that the touch screen has a large frame, which causes the display function of an edge portion of the conventional display screen opposite to the touch panel to be not well realized. Moreover, when the touch operation is performed on the OLED touch screen, the touch position cannot be well detected due to the setting of the touch chip and the signal trace. Therefore, it is necessary to design a touch display panel and a touch screen capable of accurately implementing touch detection.

Figure 1A:
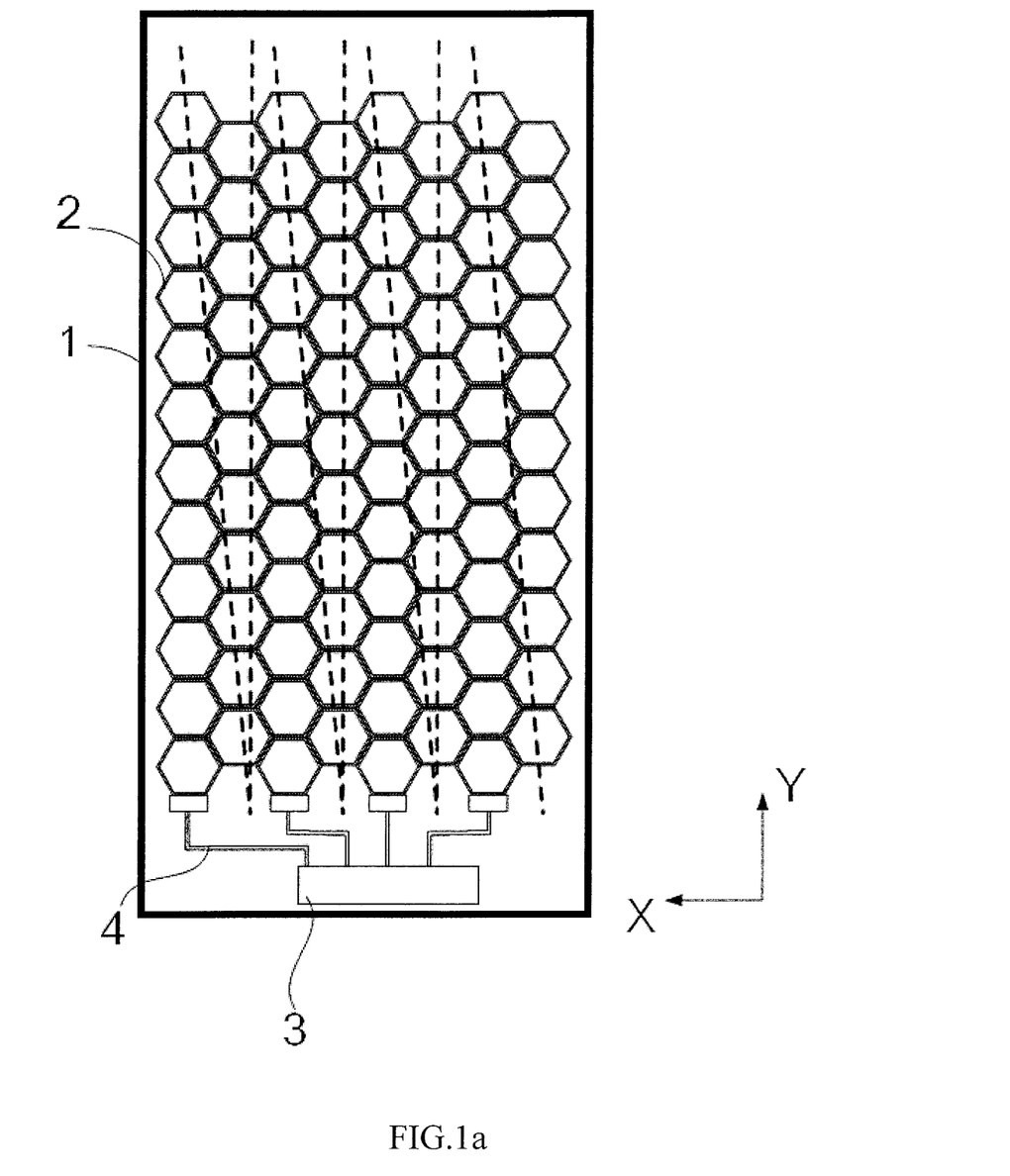
FIG. 1a is a schematic structural view of a touch electrode layer of a touch panel, according to some embodiments of the present disclosure, before being cut off.
Figure 1B:
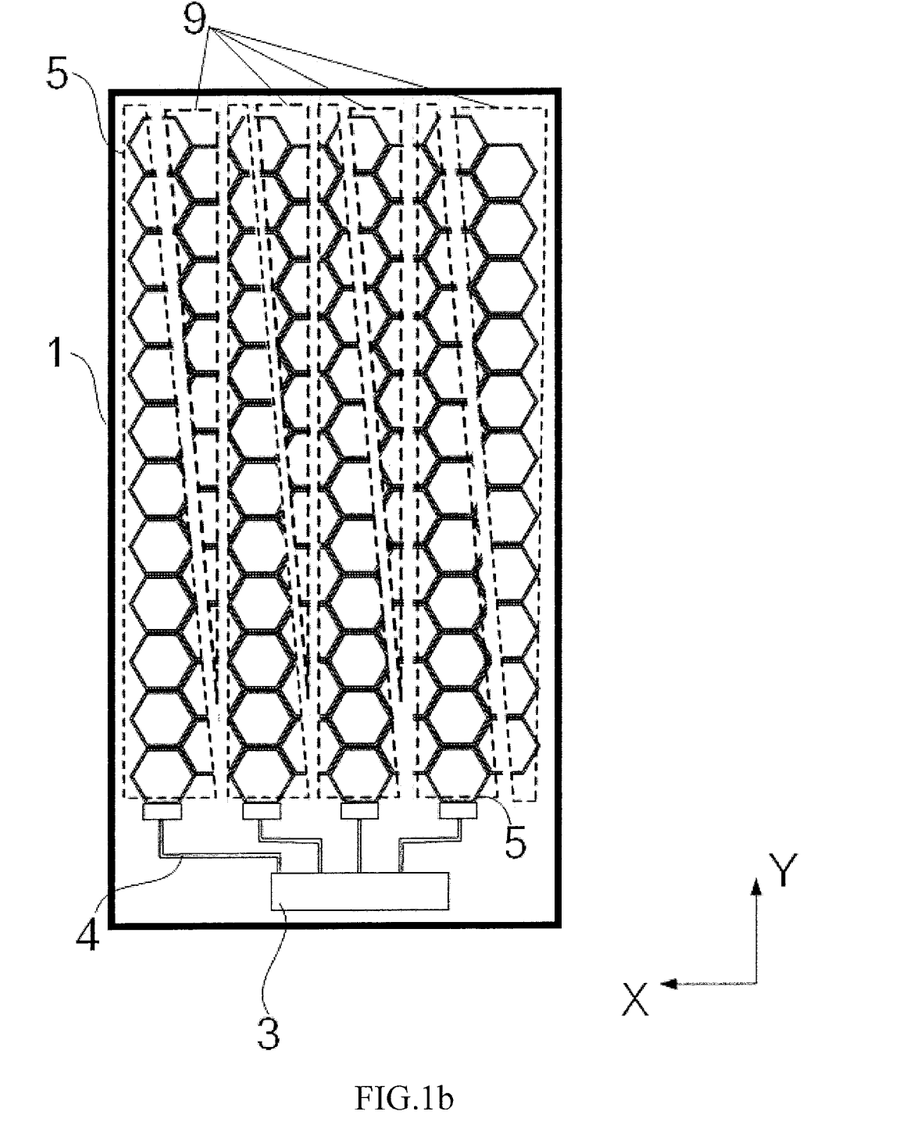
FIG. 1b is a schematic structural view of a touch electrode layer of a touch panel, according to some embodiments of the present disclosure, after being cut off.

Some embodiments of the present disclosure provide a touch panel. FIG. 1a is a schematic structural view of a touch electrode layer of a touch panel before being cut off according to some embodiments of the present disclosure. FIG. 1b is a schematic structural view of a touch electrode layer of a touch panel after being cut off according to some embodiments of the present disclosure. As shown in FIG. 1a and FIG. 1b, a touch panel includes a touch substrate 1 and a touch electrode layer 2 disposed on the touch substrate 1. In the embodiment, the touch electrode layer 2 is a metal mesh layer, for example, a honeycomb metal mesh layer having a plurality of hexagonal mesh openings. In the embodiment, the touch electrode layer 2 may also be referred to as a metal mesh layer 2.

The touch electrode layer 2 is cut off to form a plurality of touch electrodes 5 spaced apart from each other in a first direction. Each of the touch electrodes 5 extends in a second direction different from the first direction, for example, perpendicular to the first direction. A width of each touch electrode 5 gradually changes, for example, increases or decreases in the second direction. As shown in FIG. 1a and FIG. 1b, each touch electrode 5 has an elongated shape extending in a second direction. The width of each touch electrode 5 in the present disclosure refers to its size in the first direction.

In the above touch panel, an extension surface of the touch panel is set to be a plane defined by an X axis and a Y axis in a coordinate system, and the first direction is set to an X axis direction, and the second direction is set to a Y axis direction. In this case, the second direction is perpendicular to the first direction, and the touch panel determines the touch operation from the user in the X axis and the Y axis direction through the touch electrode 5. Since the plurality of touch electrodes 5 are spaced apart from each other in the first direction, each touch electrode 5 corresponds to one coordinate on the X axis. In addition, since each touch electrode 5 extends in the second direction, and the width of each touch electrode 5 gradually increases or decreases in the second direction, for each touch electrode 5 corresponding to one coordinate of the X axis and extending in the Y axis direction, touch electrode portions of the touch electrode 5 having different widths correspond to different coordinates on the Y axis. When the user performs the touch operation, the touch electrode 5 generates an electrical signal by self-capacitance, and the electrical signal is transmitted to a signal processing unit of the touch panel through the touch electrode 5. Different touch electrodes 5 correspond to position information of touch points on the X axis. For each touch electrode 5, the touch electrode portions having different widths may cause different changes in the self-capacitance of the touch electrodes 5 when being touched, and the different changes can be distinguished by the signal processing unit. That is, the touch electrode portions of the touch electrodes 5 having different widths correspond to position information of the touch points on the Y axis, and the coordinate of the touch point on the Y axis can be determined by the width of the touch electrode 5 at the touch position. Since each touch electrode 5 corresponds to one coordinate on the X axis, and different touch electrodes 5 corresponds different coordinates on the X axis, the coordinate of the touch point on the X axis is determined by the corresponding touch electrode 5. The position information of the touch point can be determined by the coordinates on the X axis and the Y axis.

Therefore, the touch panel can accurately implement touch detection, thereby obtaining good touch effects, and improving user experiences.

In the embodiment, the touch panel further includes a touch chip on one edge of the touch substrate, and each touch electrode 5 is connected to the touch chip.

In the above touch panel, as shown in FIG. 1a and FIG. 1b, the touch chip 3 of the touch panel determines touch operations of the user in the X axis and Y axis directions through the touch electrodes 5. Each touch electrode 5 is connected to the touch chip 3, and the width of each touch electrode 5 gradually increases or decreases in the second direction. When a touch operation is performed by the user, the touch electrode 5 generates an electrical signal by self-capacitance, and the electrical signal is transmitted to the touch chip 3 through the touch electrode 5. Different touch electrodes 5 correspond to position information of touch points on the X axis, and the touch electrode portions of the touch electrode 5 having the different widths correspond to position information of touch points on the Y axis. In this embodiment, the touch panel 3 is disposed only on an edge of one side of the touch substrate 1 and does not occupy spaces on edges of the other three sides of the touch substrate 1, so that the touch region of the touch panel where the touch electrodes are located occupies as large area as possible to realize a narrow frame design of the touch panel.

Based on the touch panel for touching described above, the touch panel is assembled in a touch display panel. In order to improve the touch display performance of the touch display panel, the touch electrode layer 2 adopts a mesh-like structure. That is, the touch electrode layer is a metal mesh layer. In FIG. 1a, the touch electrode layer 2 is not cut off, and is a complete metal mesh layer. Dotted lines in FIG. 1a show positions where the touch electrode layer 2 is cut off to form touch electrodes 5. FIG. 1b shows the touch electrodes 5 formed after the touch electrode layer 2 is cut off along the dotted lines in FIG. 1a. It can be seen that each touch electrode occupies at least one complete mesh at its widest portion, and the width of each touch electrode 5 is gradually reduced in the Y direction in this embodiment.

In the above touch panel, as shown in FIGS. 1a and 1b, the touch electrode layer 2 in a mesh-like structure (i.e. the metal mesh layer 2) is cut off along the dotted lines as shown in FIG. 1a to form a plurality of touch electrodes 5 (a portion enclosed by a dotted frame) and a plurality of dummy touch electrodes 9 (a portion enclosed by another dotted frame) as shown in FIG. 1b. Two adjacent columns of meshes form one touch electrode 5 extending in the second direction. Each touch electrode 5 is connected to the touch chip 3 by a signal lead-out line 4 for deriving an electrical signal, and the width of each touch electrode 5 gradually increases or decreases in the second direction of the meshes. The width of the touch electrode 5 can gradually and linearly decreases in the Y direction as shown in FIG. 1b. In other embodiments, the width of the touch electrode 5 may also be changed by stages, for example, the width increases or decreases in a stepwise manner in the Y direction, or has other forms of gradual change. In addition, one touch chip can correspond to a plurality of touch electrodes 5, and each touch electrode 5 corresponds to a position on the X axis. In the touch panel, the extension surface of the touch panel set to be a plane defined by an X-axis and a Y-axis in a coordinate system. The touch panel 3 of the touch panel determines touch operations of the user in the X-axis and the Y-axis directions through the touch electrodes 5. When a touch operation is performed by the user, the touch electrode 5 with a mesh structure generates an electrical signal by self-capacitance, and the electrical signal is transmitted to the signal lead-out line 4 through the touch electrode 5, and then the signal lead-out line 4 transmits the electrical signal from the touch electrode 5 to the touch chip 3. The width of the touch electrode 5 is gradually increased or decreased along the column direction of the meshes. For each touch electrode 5, the touch electrode portions having different widths may cause different changes in the self-capacitance of the touch electrodes 5 when being touched, and the different changes can be distinguished by the touch chip 3. That is, the touch electrode portions of the touch electrodes 5 having different widths correspond to position information of the touch points on the Y axis. As shown in FIG. 1b, since the width of the touch electrode 5 gradually decreases in the Y direction, the coordinate of the touch operation of the user on the Y axis can be determined by the touch electrode portion of the touch electrode 5 having a specific width at the touch position. And each of the touch electrodes 5 corresponds to one coordinate on the X-axis and is connected to one channel of the touch chip 3. Therefore, the coordinate of the touch operation of the user on the X-axis can be determined by the channel of the touch chip 3. The touch position information can be determined by the coordinates on the X axis and the Y axis. As shown in FIG. 1b, since the touch chip 3 and the signal lead-out lines 4 are disposed on the edge of one side of the touch substrate 1 does not occupy spaces on edges of the other three sides of the touch substrate 1, so that the touch region of the touch panel where the touch electrodes are located occupies as large area as possible to realize a narrow frame design of the touch panel. A touch display panel adopting the touch panel can also have the narrow frame design to obtain good touch display effects and improve user experiences.

Based on the above touch panel for implementing touch, in order to improve the flexible bending performance of the touch panel, the touch electrode layer 2 may be made of a flexible material.

In the touch display panel, the OLED display panel as a display member can be bent and has a flexible characteristic. In order to ensure that the touch display panel has a flexible characteristic, the touch panel matched with the display member also needs to have a bendable and flexible characteristic. Therefore, the touch panel 2 is made of a flexible material, so that the touch panel has a bendable and flexible characteristic. As a result, when the touch panel is bent, the touch panel can generate a ductile deformation, thereby avoiding brittle fracture of film layers, and improving the bendable performance of the touch panel.

In order to obtain the touch electrode layer 2 with excellent flexibility, specifically, as shown in FIGS. 1a and 1b, the touch electrode layer 2 is a metal mesh layer including hexagonal mesh openings.

Since a metal material, such as silver, copper or the like, has good ductility and good electrical conductivity, the touch electrode layer 2 with excellent flexibility can be prepared by using the metal material, and the touch electrode layer 2 prepared by using the metal material can make the touch performance more sensitive and excellent. In addition, in a conventional touch panel with a mutual capacitive mode, and a touch electrode layer includes two electrode layers, that is, a touch sensing layer Rx and a touch signal emitting layer Tx. An insulating layer needs to be disposed between the touch sensing layer Rx and the touch signal emitting layer Tx. The touch electrode layer needs to be formed by three patterning processes using at least three masks. Compared with the conventional touch panel with the mutual capacitive mode, the touch electrode layer in the touch panel described above is a metal mesh layer and implements the touch function by self-capacitance. Therefore, the touch electrode layer is formed by one patterning processes using only one mask. The number of mask is small, it may be beneficial to reduce the cost of products and improve the competitiveness of products.

In one embodiment, the touch panel can remove the dummy touch electrodes 9 on the basis of the foregoing embodiments shown in FIG. 1b, and only the touch electrodes 5 that implement the touch are retained.

Figure 2:
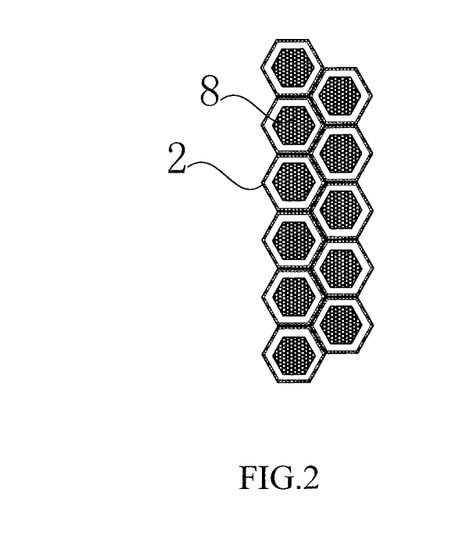
FIG. 2 is a schematic top view of a partial region of a touch display panel according to some embodiments of the present disclosure.

In other embodiments, the touch electrode layer 2 may also be a transparent electrode of a whole layer, such as an ITO electrode. The transparent electrode is cut into a plurality of touch electrodes 5 spaced apart from each other in a first direction. A width of each touch electrode 5 is gradually changed in a second direction different from the first direction, for example, the second direction is perpendicular to the first direction. The above touch effect can also be achieved.

some embodiments of the present disclosure provide a touch display panel including the touch panel in the above embodiments. As shown in FIG. 2, the touch display panel includes a plurality of pixels 8, and the touch electrode layer in a mesh-like structure has a plurality of mesh openings. The mesh openings are in one-to-one correspondence with the pixels 8.

Figure 3:
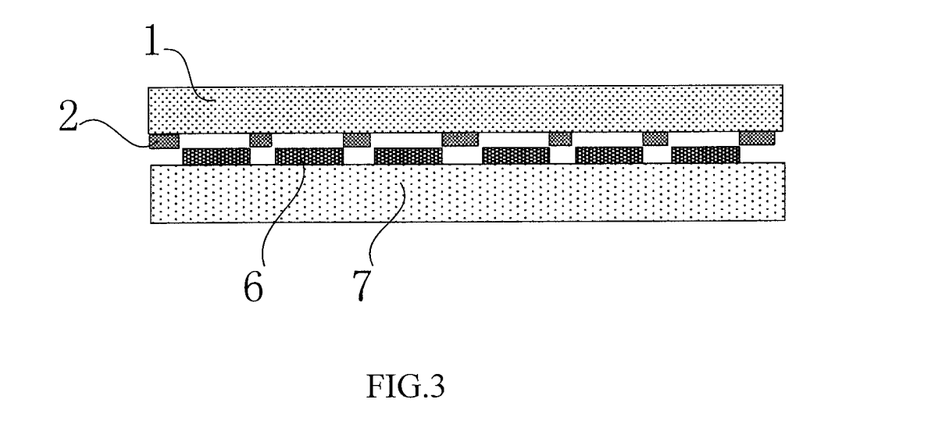
FIG. 3 is a schematic cross-sectional view of a touch display panel according to some embodiments of the present disclosure.
Figure 4:
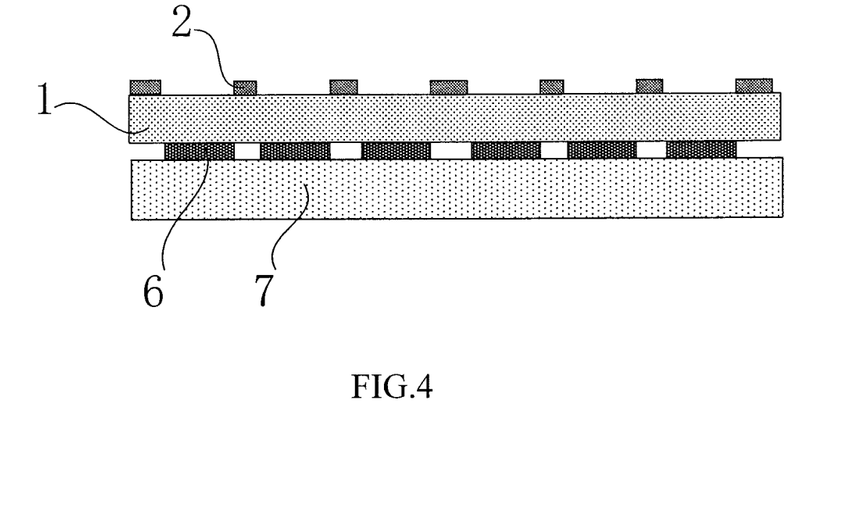
FIG. 4 is a schematic cross-sectional view of a touch display panel according to some embodiments of the present disclosure.

Specifically, as shown in FIGS. 2-4, the touch display panel further includes a base substrate 7 and a plurality of organic light emitting layers 6 disposed on the base substrate 7. Each organic light emitting layer 6 corresponds to one pixel 8. That is, each pixel 8 is an OLED and includes one organic light emitting layer 6. Each pixel 8 has a hexagonal structure and the pixels 8 are arranged in a honeycomb shape. The mesh openings of the touch electrode layer 2 (i.e. the metal mesh layer) are in one-to-one correspondence with the pixels 8 of the display panel. An orthographic projection of each pixel 8 on the base substrate 7 falls within an orthographic projection of one corresponding mesh opening on the base substrate. In an embodiment, the orthographic projection of each pixel 8 on the base substrate 7 coincides with the orthographic projection of one corresponding mesh opening on the base substrate. In this way, it may avoid metal lines of the metal mesh layer from shielding the pixels, and the reaction sensitivity of the touch electrode 5 is improved, thereby improving the user experience.

The side length of hexagon of each mesh opening of the metal mesh layer is not limited, and each mesh opening may correspond to the size of the pixel 8 corresponding to the organic light emitting layer 6. The mesh opening and the pixel 8 may have the same shape, both of them are hexagon. The shape of the metal mesh opening may be inconsistent with the shape of the pixel. For example, the shape of the pixel 8 is not necessarily a hexagon, and may be a circle, and may also be other irregular patterns, as long as the metal lines of the metal mesh layer are prevented from shielding the pixel.

In an embodiment, as shown in FIGS. 1a, 1b, and 2, an orthographic projection of each of the metal lines of the metal mesh layer on the base substrate is located in an opaque region between the pixels 8.

By aligning the film layers with the masks, it is ensured that the upper and lower film layers are nested such that the projection the metal lines of the metal mesh layer on an plane, where the pixels 8 are located, is located in the opaque region between the pixels 8. That is, the metal lines of the metal mesh are nested in a gap between the pixels 8 of the touch display panel, so that the touch display panel has good optical image removal effect. ensuring the metal mesh Nested in the gap between the pixel units 8 of the touch display panel, the touch display panel has a good optical effect.

The touch electrode layer 2 may be positioned on the touch substrate 1 as follows.

In one manner, as shown in FIG. 3, the touch electrode layer 2 is located on a side of the touch substrate 1 facing the pixels 8.

The touch electrode layer 2 is simple to manufacture and is easy to implement. In this mode, since the touch electrode layer 2 is closer to the organic light emitting layers 6 corresponding to the pixels 8, the electrical signal generated by the touch operation is greatly disturbed. In order to make the sensitivity of the touch operation better and the touch performance is more excellent, and the touch chip 3 needs to be debugged multiple times to ensure the accuracy of the touch display.

In another manner, as shown in FIG. 4, the touch electrode layer 2 is located on a side of the touch substrate 1 facing away from the pixels 8.

In this case, the touch electrode layer 2 is far away from the organic light emitting layers 6 the corresponding to the pixels 8, and the electrical signal generated by the touch operation is less disturbed, so that the touch operation is more sensitive and the touch performance is better.

In addition, the present disclosure further provides a touch display device, including the touch display panel of any of the above embodiments.

The touch display panel provided by any one of the above embodiments can accurately implement the touch detection, obtain a good touch display effect, and improve the user experience. Therefore, the touch display device having the touch display panel has a good touch display effect and a good user experience.

Figure 5:
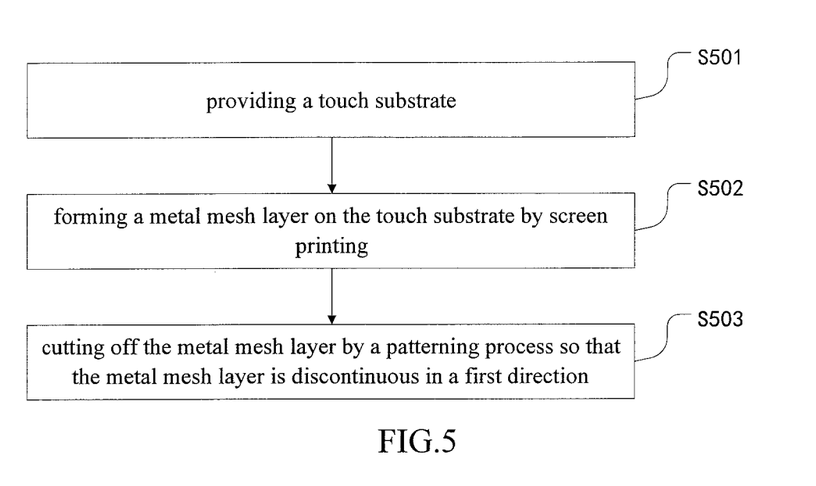
FIG. 5 is a flowchart showing a method of manufacturing a touch panel according to some embodiments of the present disclosure.

Some embodiments of the present disclosure provide a method of manufacturing a touch panel. As shown in FIG. 5, the method includes the following steps:

S501: providing a touch substrate;
S502: forming a metal mesh layer on the touch substrate by screen printing;
S503: cutting off the metal mesh layer by a patterning process so that the metal mesh layer is discontinuous in a first direction.

Through the above steps, a plurality of touch electrodes 5 are formed on the touch substrate as shown in FIG. 1b, the plurality of touch electrodes 5 being spaced apart from each other in the first direction and extending in a second direction different from the first direction.

Figure 6:
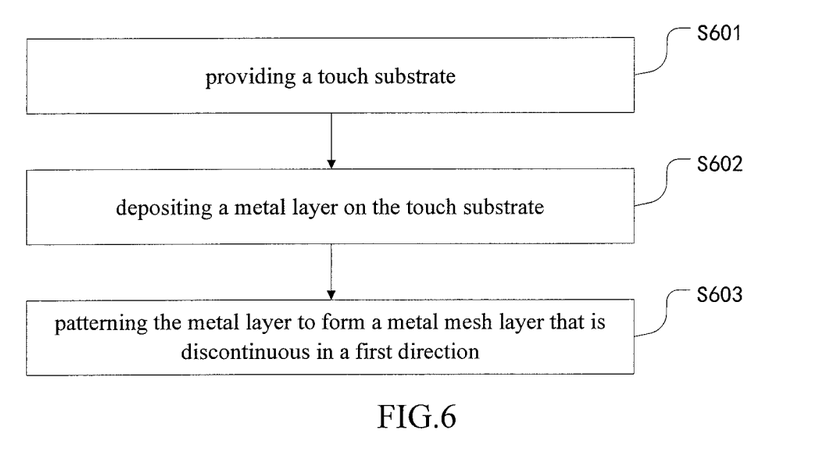
FIG. 6 is a flowchart showing a method of manufacturing a touch panel according to some embodiments of the present disclosure.

Some embodiments of the present disclosure provide a method of manufacturing a touch panel. As shown in FIG. 6, the method includes the following steps:

S601: providing a touch substrate,
S602: depositing a metal layer on the touch substrate;
S603: patterning the metal layer to form a metal mesh layer that is discontinuous in a first direction.

Through the above steps, a plurality of touch electrodes 5 are formed on the touch substrate as shown in FIG. 1b, the plurality of touch electrodes 5 being spaced apart from each other in the first direction and extending in a second direction different from the first direction.

It will be apparent to those skilled in the art that various modifications and variations can be made in the embodiments of the present disclosure without departing from the spirit and scope of the disclosure. If such modifications and variations of the present disclosure are within the scope of the appended claims and their equivalents, it is intended that the present disclosure cover the modifications and variations.

What is claimed is:

1. A touch display panel comprising:
   a base substrate,
   a plurality of pixels on the base substrate, and
   a touch panel,
   wherein the touch panel is stacked on the base substrate,
   wherein each of the pixels comprises an organic light emitting layer,
   wherein the touch panel comprises:
   a touch substrate;
   a plurality of touch electrodes on the touch substrate, wherein the plurality of touch electrodes is spaced apart from each other in a first direction and extending in a second direction different from the first direction, each of the touch electrodes has a metal mesh structure which is cut off in the first direction, and
   a width of each of the touch electrodes gradually increases or decreases in the second direction; and a plurality of dummy touch electrodes in the same layer as the plurality of touch electrodes, wherein the plurality of dummy touch electrodes and the plurality of touch electrodes are alternately arranged one by one in the first direction, the plurality of dummy touch electrodes extend in the second direction, each of the dummy touch electrodes has a metal mesh structure which is cut off in the first direction, and a width of each of the dummy touch electrodes gradually decreases or increases in the second direction, wherein the plurality of touch electrodes and the plurality of dummy touch electrodes constitute a metal mesh layer which is discontinuous in the first direction, wherein the metal mesh layer comprises a plurality of mesh openings having a hexagonal shape, and the mesh openings of the metal mesh layer are arranged in a honeycomb shape.

2. The touch display panel of claim 1, wherein the plurality of mesh openings in the metal mesh layer are in one-to-one correspondence with the plurality of pixels, and an orthographic projection of each of the pixels on the base substrate falls within an orthographic projection of a corresponding mesh opening on the base substrate.

3. The touch display panel of claim 1, wherein the plurality of mesh openings in the metal mesh layer are in one-to-one correspondence with the plurality of pixels, and an orthographic projection of each of the pixels on the base substrate coincides with an orthographic projection of a corresponding mesh opening on the base substrate.

4. The touch display panel of claim 1, wherein the metal mesh layer is on a side of the touch substrate facing the pixels.

5. The touch display panel of claim 1, wherein the metal mesh layer is on a side of the touch substrate facing away from the pixels.

6. The touch display panel of claim 1, wherein an orthographic projection of the plurality of touch electrodes on the base substrate does not overlap with an orthographic projection of the plurality of pixels on the base substrate.

7. The touch display panel of claim 1, wherein the metal mesh layer is made of a flexible material.

8. The touch display panel of claim 1, wherein the width of each of touch electrodes gradually increases or decreases linearly in the second direction.

9. The touch display panel of claim 1, wherein the width of each of touch electrodes gradually increases or decreases in a stepwise manner in the second direction.

10. The touch display panel of claim 1, further comprising a touch chip on an edge of one side of the touch substrate, wherein each of touch electrodes is connected to the touch chip.

11. A method of manufacturing the touch display panel of claim 1, comprising:
providing a touch substrate, and
forming a plurality of touch electrodes on the touch substrate, the plurality of touch electrodes being spaced apart from each other in a first direction and extending in a second direction different from the first direction.

12. The method of claim 11, wherein forming a plurality of touch electrodes on the touch substrate comprises:
forming a metal mesh layer on the touch substrate by screen printing; and
cutting off the metal mesh layer by a patterning process so that the metal mesh layer is discontinuous in the first direction.

13. The method of claim 12, wherein the metal mesh layer comprises a plurality of mesh openings having a shape of hexagonal, and the mesh openings of the metal mesh layer are arranged in a honeycomb shape.

14. The method of claim 11, wherein forming a plurality of touch electrodes on the touch substrate comprises:
depositing a metal layer on the touch substrate; and
patterning the metal layer to form a metal mesh layer that is discontinuous in the first direction.

* * * * *